Patented Nov. 11, 1924.

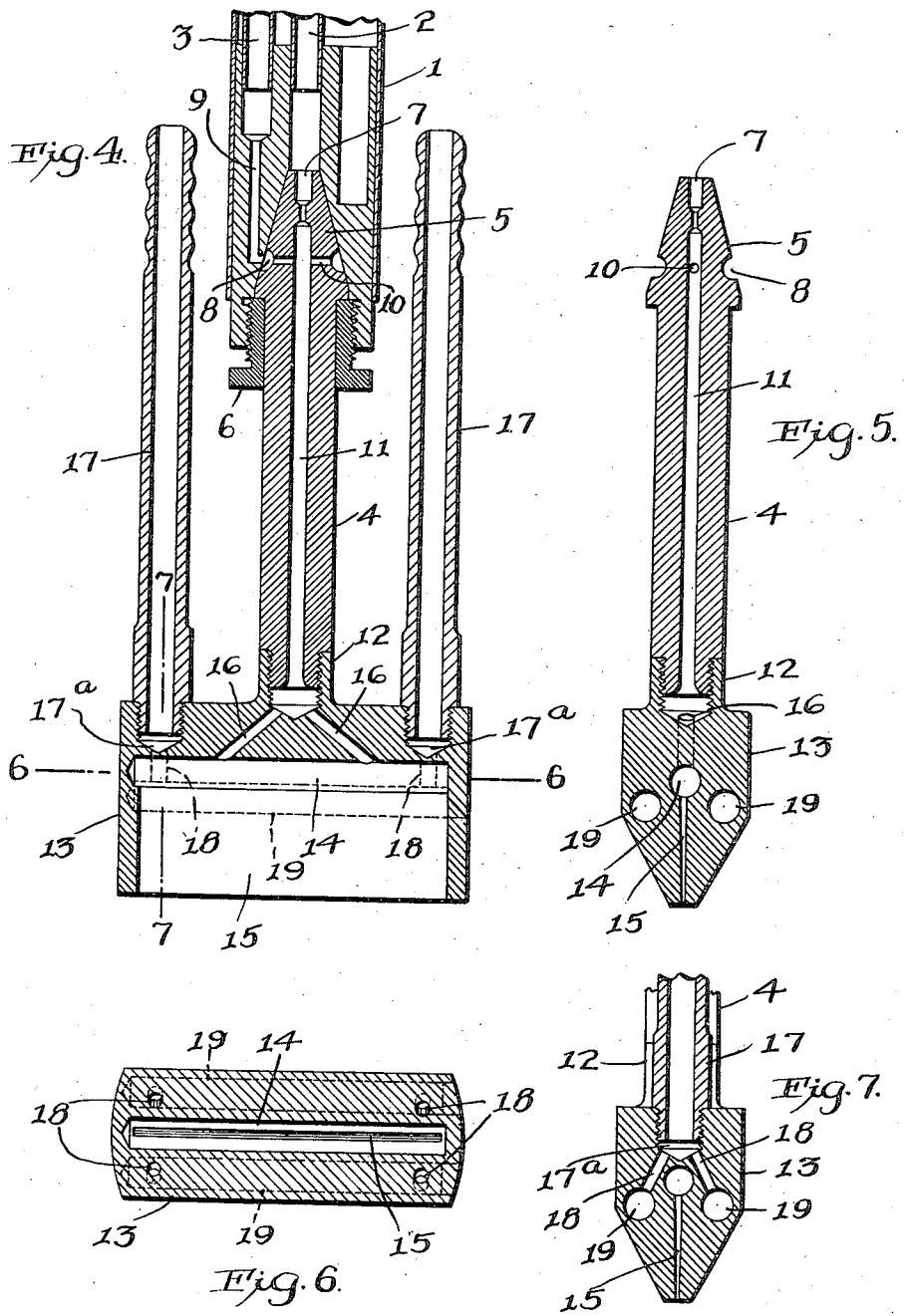

1,514,815

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

SLOTTED WELDING TORCH.

Application filed August 13, 1919, Serial No. 317,283. Renewed April 10, 1924.

*To all whom it may concern:*

Be it known that I, JAMES L. ANDERSON, a citizen of the United States, and resident of Bayonne, in the county of Hudson and State of New Jersey, have invented a new and useful Slotted Welding Torch, of which the following is a specification.

The object is to provide a blowpipe capable of operating with highly explosive mixtures, such as oxygen and acetylene, to deliver a continuous ribbon-flame suitable for autogenous welding. Owing to the high rate of flame propagation in such a mixture and the intense heat developed, a simple slotted outlet from a chamber or conduit is impractical. The present invention makes it possible to produce with safety continuous flames of this character of substantial length.

In the accompanying drawings illustrating the preferred embodiment of the invention:

Fig. 4 is a central longitudinal section in a plane parallel with the greatest width;

Fig. 5 is a central longitudinal section at right angles to Fig. 4;

Fig. 6 is a horizontal section on the line 6—6 of Fig. 4; and

Fig. 7 is a fragmentary vertical section on the line 7—7 of Fig. 4.

Figure 1:
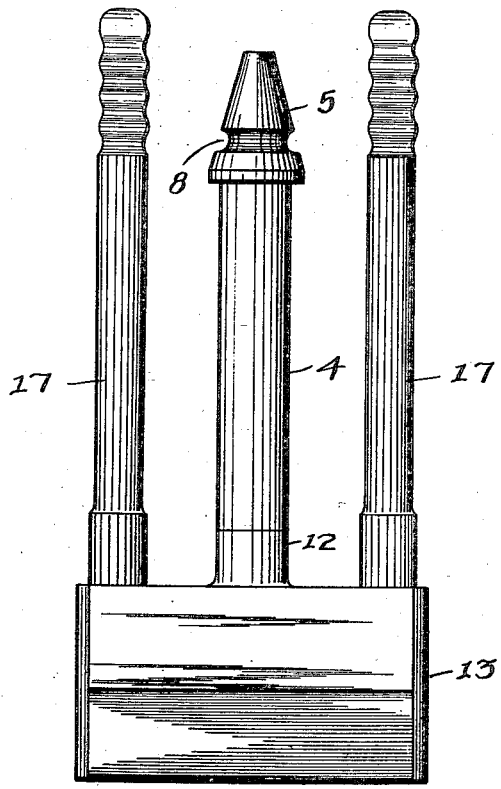
Fig. 1 is a side elevation of the burner.
Figure 2:
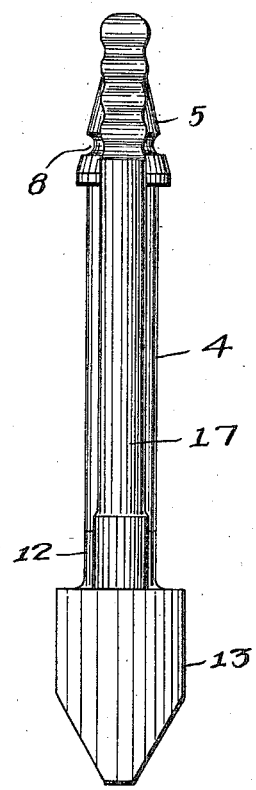
Fig. 2 is an end elevation thereof.
Figure 3:
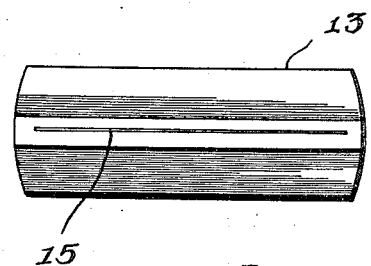
Fig 3 is a plan view looking at the delivery slot.

The numeral 1 designates a holder ar 1 conductor similar to the body of a standai d oxyacetylene torch. This body contains two supply conduits 2 and 3 for oxygen and acetylene, respectively, connected with suitable sources of supply, not shown. The tip is separable from the holder, and includes a stem 4 having a truncated conical rear portion 5 adapted to seat tightly in a corresponding socket in the body, where it is held by a clamp nut 6. The said seating portion 5 has a longitudinal inlet port 7 arranged to communicate with the oxygen conduit 2, and a circumferential groove 8 which communicates with a passage 9 in the head leading from the acetylene conduit 3. From the channel 8 acetylene inlet ports 10 are drilled inward to meet a mixing or combining passage 11 extending to the forward end of the stem. The proportioning and mixing means of oxyacetylene torches being well known, this part of the apparatus requires no special explanation.

The forward end of the stem 4 is screwed into a boss 12 on a nozzle 13, which is elongated transversely of the stem and lengthwise with respect to the seam to be welded. This nozzle is formed of a block of metal slotted and drilled to provide heavy-walled passages of special character, now to be described.

A large bore 14 is formed in the rear or basal portion of the nozzle block, extending centrally in the direction of the greatest width. The forward or delivery part of the nozzle is laterally beveled, and in this portion a transversely extending delivery slot 15 is cut to intersect the supply chamber 14, the base of this slot being abruptly much narrower than the supply chamber. Diverging bores 16 extend from the interior of the boss 12 to the chamber 14, so as to deliver the mixture from the passage 11 to the chamber at a plurality of points, in order that the flow and pressure may be distributed in the delivery slot. The formation of this slot is of importance. At the base it is much narrower than the chamber 14, and thence it tapers gradually and for a depth many times its breadth to the issue, which is of slit-like proportions. The slot may be, for example, three-quarters of an inch deep, a thirty-second of an inch wide at the base or inlet, three one-thousandths of an inch wide at the issue slit, and several to many times as long as it is deep. Needless to say dimensions will vary under different conditions and for different sizes of burner. Such a delivery passage can be produced by first sawing a parallel-walled slot extending from the discharge face to the supply chamber and from end to end of the block, then squeezing the sides of the block so as to cause the walls of the slot to converge until they almost meet at the lips, and finally plugging up the ends.

Inlet and outlet hose connection nipples 17 are screwed into the back or base of the nozzle block, at opposite sides of the stem 4. From the chambers 17$^a$, to which the nipples are connected, diverging bores 18 extend to a pair of bores 19 extending transversely in the block at opposite sides of the delivery slot. These bores constitute cooling chambers which receive water at one end from one of the external connections 17, through its internal branch passages 18, and after conducting the water across the tip deliver it through the other pair of passages 18 to the outlet connection.

In operation the oxygen and acetylene are supplied under suitable pressures, are brought together in proper proportions, and the mixture is conducted to the nozzle block, where it is distributed to the different parts of the supply chamber 14, and thence flows outward through the narrow deeply-tapered delivery slot and burns at the issue as a stable, uniform and continuous ribbon flame. The taper of the deep slot maintains the velocity of the outflowing explosive mixture, and admits of the use of a hair-line discharge orifice remote from the supply chamber.

For simplicity the invention has been illustrated in connection with a single ribbon flame. The same principle of construction obviously applies to the double or multiple flame type of torch for spread-flame welding disclosed in my application Serial No. 317,282, filed August 13, 1919.

What I claim as new is:

1. In a blowpipe for highly explosive gaseous mixtures such as oxygen and acetylene, a transversely elongated nozzle containing a transverse supply chamber for the mixed gases and a narrow slotted delivery passage deeply tapering to a hair-line issue, the base of said passage opening from the supply chamber and being abruptly much narrower than said chamber.

2. A blowpipe for highly explosive gaseous mixtures such as oxygen and acetylene having a mixer, a narrow, deeply tapered, slotted delivery passage, a transverse bore forming a supply chamber extending adjacent the base of the slot, and means for distributing the mixture into said chamber at a plurality of points.

3. A blowpipe for highly explosive gaseous mixtures such as oxygen and acetylene having a mixer and conduit for the combined gases, a narrow, deeply tapered slotted delivery passage, a transverse bore forming a supply chamber extending adjacent the base of the slot, and diverging passages connecting said conduit with said chamber.

JAMES L. ANDERSON.